(12) United States Patent
Miller

(10) Patent No.: US 7,841,814 B2
(45) Date of Patent: Nov. 30, 2010

(54) TRAILER AND METHOD OF TRANSPORTING AN ENGINE

(75) Inventor: Ronald Coleman Miller, San Antonio, TX (US)

(73) Assignee: Standard Aero (San Antonio), Inc., San Antonio, TX (US)

( * ) Notice: Subject to any disclaimer, the term of this patent is extended or adjusted under 35 U.S.C. 154(b) by 691 days.

(21) Appl. No.: 11/823,952

(22) Filed: Jun. 29, 2007

(65) Prior Publication Data
US 2009/0001702 A1    Jan. 1, 2009

(51) Int. Cl.
B60P 7/08    (2006.01)
(52) U.S. Cl. .................. 410/47; 410/44; 280/405.1
(58) Field of Classification Search ............ 410/31, 410/32, 33, 35, 36, 42, 43, 44, 46, 47; 414/589; 280/405.1, 493
See application file for complete search history.

(56) References Cited

U.S. PATENT DOCUMENTS

| | | | |
|---|---|---|---|
| 3,659,892 A * | 5/1972 | Briggs .................. 410/46 |
| 4,440,265 A | 4/1984 | Spagnoli | |
| 4,461,455 A | 7/1984 | Mills et al. | |
| 4,660,796 A | 4/1987 | Garrec | |
| 4,664,586 A | 5/1987 | Vassalotti | |
| 4,969,367 A | 11/1990 | Huber et al. | |
| 5,383,652 A | 1/1995 | Van Den Berg | |
| 5,570,754 A | 11/1996 | Stimson | |
| 5,575,607 A | 11/1996 | Grout et al. | |
| 5,984,613 A | 11/1999 | Motilewa | |
| 6,292,999 B1 | 9/2001 | Rossway et al. | |
| 6,485,247 B1 | 11/2002 | Groves et al. | |
| 6,935,668 B1 | 8/2005 | Summers | |
| 6,935,818 B2 * | 8/2005 | Hoeper et al. ............ 410/18 |
| 7,103,952 B2 | 9/2006 | Appleton et al. | |
| 7,134,829 B2 | 11/2006 | Quenzi et al. | |

* cited by examiner

*Primary Examiner*—Stephen Gordon
(74) *Attorney, Agent, or Firm*—Quarles & Brady LLP

(57) ABSTRACT

In a particular embodiment, a trailer is disclosed that includes a base, a frame extending from the base, and mounting structures coupled to the frame. The mounting structures are adapted to releasably secure an engine, such as an aircraft engine, to the frame such that the engine is secured to the frame and suspended above the base without contacting the base.

27 Claims, 7 Drawing Sheets

TRAILER AND METHOD OF TRANSPORTING AN ENGINE

FIELD OF THE DISCLOSURE

The present disclosure is generally related to a trailer and to a method of transporting an engine using a trailer.

BACKGROUND

Engines, such as aircraft engines, are routinely taken out of service for periodic maintenance and repairs. For example, an aircraft engine can be removed from a wing of an aircraft, serviced, and reattached to the wing. In some instances, the engine may need to be moved using a trailer. Conventionally, the engine may be secured to the trailer at one end and may rest on a support structure (e.g., a bracket, rails, etc.) at another portion of the engine. However, such support structures may allow undesired shifting of the engine during transport. Additionally, such structures place pressure on the relatively thin engine housing material, which may cause damage during transport.

Additionally, such trailers typically do not provide sufficient ground clearance to allow for transport of the engine with the propeller mounted. Accordingly, the propeller is typically removed during transportation to and from the repair facilities. In some instances, the propeller is mounted during servicing so that repairs may be tested. After servicing, the propeller is then removed so that the engine can be transported to the wing of the aircraft, where the engine can be re-attached. The propeller can then be re-attached. In some instances, an aircraft engine may be removed from the wing of an aircraft and stored for a period of time. For propeller engines, the propeller should be rotated periodically to circulate oil to the ball bearings. However, conventional trailers do not provide adequate clearance for propeller rotation. Hence, there is a need for an improved apparatus and a method of transporting an engine.

DETAILED DESCRIPTION OF THE DRAWINGS

In a particular embodiment, a trailer is disclosed that includes a base, a frame extending from the base and mounting structures coupled to the frame. The mounting structures are adapted to releasably secure an engine, such as an aircraft engine, to the frame such that the engine is secured to the frame and suspended above the base without contacting the base.

In another particular embodiment, a trailer is disclosed to transport an aircraft engine. The trailer includes a base having a front axle including a pair of wheels and a rear axle including a pair of wheels. The trailer also includes a frame extending from the base at a location along the base that is proximate to the rear axle and includes mounting structures coupled to the frame and adapted to releasably secure an aircraft engine to the frame such that the aircraft engine is secured to the frame and supported by the frame without contacting the base.

In still another particular embodiment, a trailer to transport an aircraft engine is disclosed that includes a base, a frame extending from the base, and first and second mounting structures. The first mounting structure is coupled to the frame at a first height and is adapted to mate with a first corresponding engine mounting structure of an aircraft engine. The first mounting structure includes a first opening sized to receive a first fastener associated with the aircraft engine and includes a second opening to provide access to a nut to secure the first fastener. The second mounting structure is coupled to the frame at a second height and is adapted to mate with a second corresponding engine mounting structure of the aircraft engine. The second mounting structure includes a third opening sized to hold a second fastener to mate with a corresponding recess of a mount structure associated with the aircraft engine. The first mounting structure and the second mounting structure cooperate to secure and support the aircraft engine such that the aircraft engine does not contact the base.

In yet another particular embodiment, a method of transporting an aircraft engine is disclosed. The method includes coupling an aircraft engine to a movable trailer that includes a base, a frame extending from the base, and at least two mounting structures coupled to the frame and adapted to releasably secure an engine to the frame such that the engine is secured to the frame and suspended above the base without contacting the base. The method also includes positioning the movable trailer that secures the aircraft engine at a location apart from a wing of an aircraft.

Figure 1:
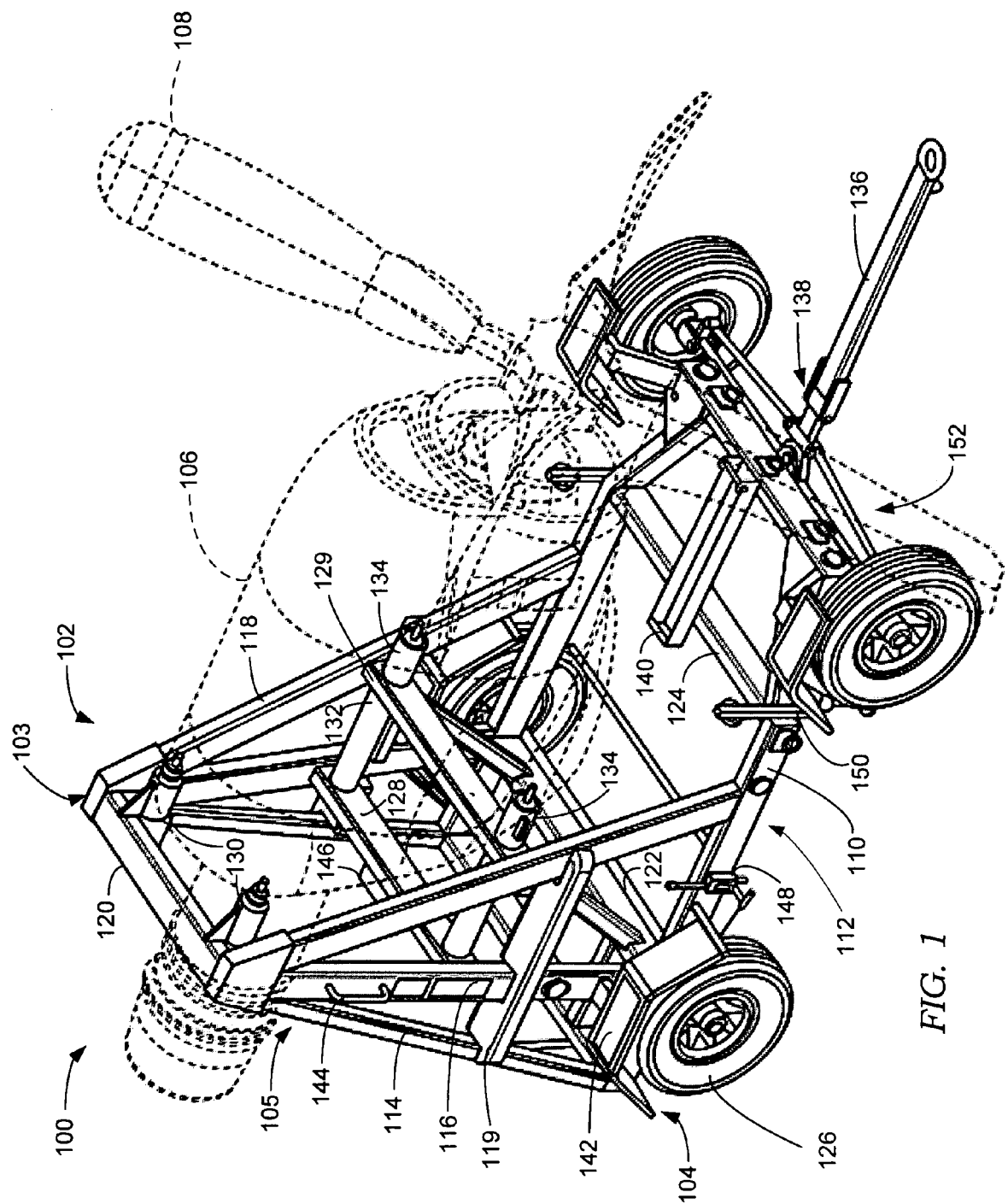
FIG. 1 is a top plan view of a particular illustrative embodiment of an apparatus to transport an engine.

FIG. 1 is a top plan view of a particular illustrative embodiment of a trailer 100 to support an engine 106 that includes a propeller 108 (shown in phantom). The trailer 100 includes a base 110 and a frame structure 102 that is fixedly attached to the base 110 and that extends substantially normal to the base 110. The frame structure 102 includes a pair of rear members 114, a pair of center stanchions 116, a pair of forward members 118, and a top member 120. The rear members 114 are attached to the base 110 at a rear portion 104 of the base 110. The center stanchions 116 are attached to the base 110 at a second location, which may be selected based on properties associated with the engine to be transported, such as the weight, length, center of gravity, other parameters, or any combination thereof. The forward members 118 are attached to the base 110 near a center portion 112 of the base 110. The rear members 114 and the forward members 118 extend from the base 110 at opposing angles that are less than 90 degrees to form a pair of a-shaped frames 103 and 105 that are connected by the top member 120. Each a-shaped frame 103 and 105 is coupled to the base 110 at a proximal end and to the top member 120 at an apex or distal end. A pair of supports 119 couple the rear member 114, the center stanchion 116 and the forward member 118 of each of the a-shaped frames 103 and 105.

The base 110 includes multiple cross supports, such as supports 122 and 124. Additionally, the frame 102 includes cross supports 128 and 129, which are coupled between the rear members 114 and the forward members 118, respectively.

The frame structure 102 includes upper mounting structures 130 coupled to the top member 120. The frame structure 102 also includes mounting structure supports 132 coupled between the cross supports 128 and 129. Lower mounting structures 134 extend from the mounting structure supports 132. The upper and lower mounting structures 130 and 134 are adapted to mate with corresponding attachment structures (not shown) of the engine 106 to secure and support the engine 106. The frame structure 102 and the upper and lower mounting structures 130 and 134 cooperate to secure and suspend the engine 106 without permitting the engine 106 to contact the base 110 or any corresponding bracket on the base 110.

The trailer 100 includes pneumatic tires 126, which provide shock resistance for transporting the engine 106 over bumps. The trailer 100 includes a tow rod 136, which is releasably attached to the base 110 at a coupling joint 138. A bracket 140 is provided to receive the tow rod 136 when the tow rod 136 is released from the coupling joint 138. The trailer 100 may include a step 142 and a handle 144, which may be attached to the center stanchion 116 to provide access to the upper mounting structures 130. Additionally, a storage box 146 may be coupled to the cross support 128 for storage of bolts and associated tools. The trailer 100 may also include brakes 148.

The trailer 100 also includes two or more supports 150, which may be extended to elevate a forward portion 152 of the trailer 100, providing clearance for the propeller 108. By removing the tow rod 136 and by elevating the front portion 152 of the trailer 100, sufficient ground clearance may be established to allow for rotation of the propeller 108. Thus, the trailer 100 may be used to transport and store engines, such as the aircraft engine 106 without removing the propeller 108.

In a particular illustrative embodiment, the frame 102 may be attached to the base 110 at a location selected such that a center of gravity of the engine 106 (when attached to the upper and lower mounting supports 130 and 134) is approximately centered over the base 110. In a particular embodiment, the frame 102 may be located proximate to a rear axle of the trailer 100, such that the center stanchions 116 are attached to the base 110 above the rear axle.

In general, it should be understood that the particular spacing between the upper mounting structures 130 corresponds to a pre-determined spacing of the existing mount structures of the aircraft engine to be mounted. Additionally, the spacing between the lower mounting structures 134 may also be determined by the pre-determined spacing of corresponding lower mounting structures of the engine. Further, a vertical spacing between the upper mounting structures 130 and the lower mounting structures 134 may be determined by the vertical spacing between the corresponding mounting structures of the aircraft engine.

Figure 2:
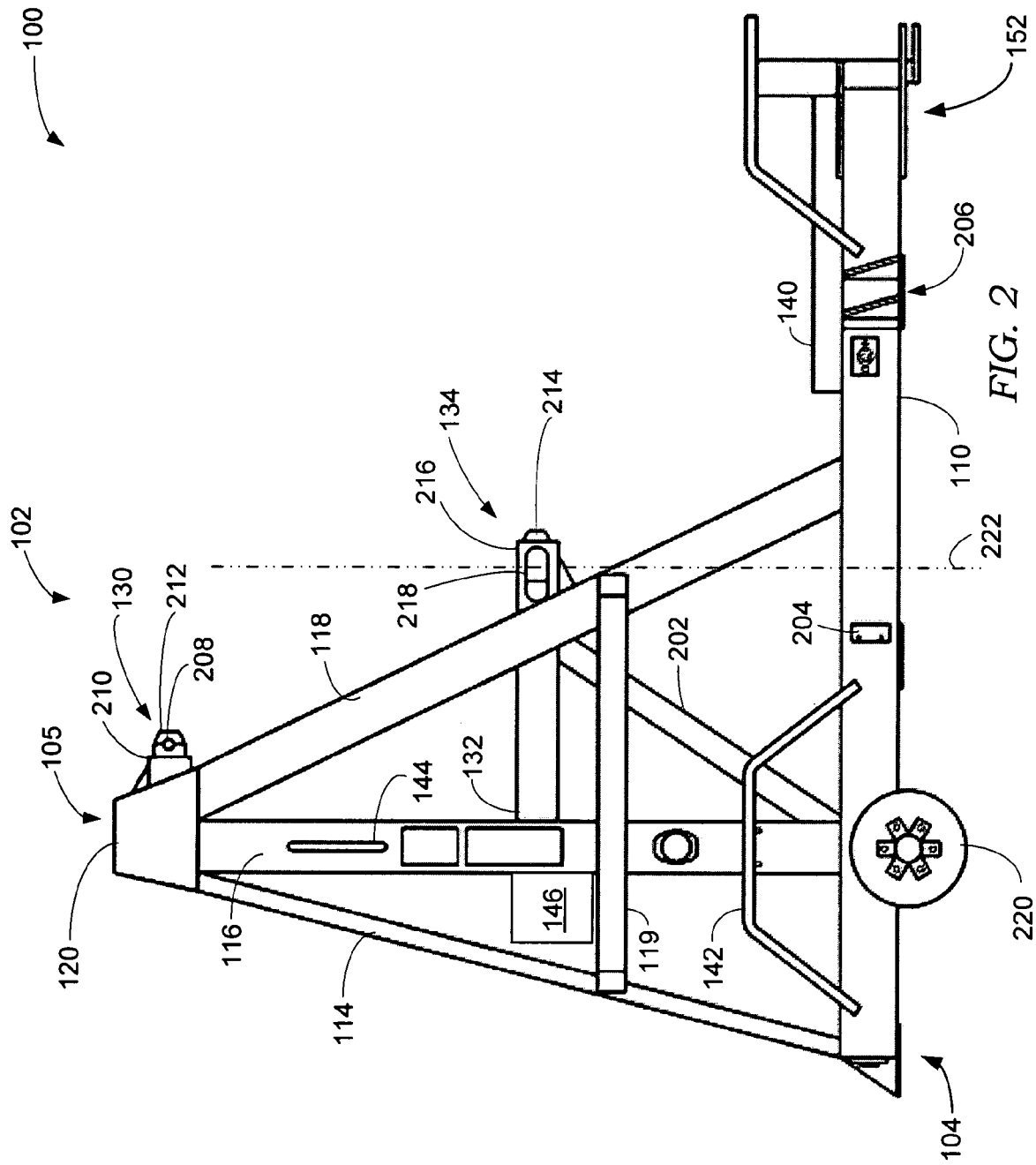
FIG. 2 is a side view of the apparatus of FIG. 1.

Referring to FIG. 2, the trailer 100 is shown in a side view. The trailer 100 includes a base 110 and a frame structure 102. The frame structure 102 includes the rear member 114 extending from the base 110 at an angle that is less than 90 degrees, the center stanchion 116 extending from the base 110 at an angle that is approximately perpendicular to the base 110, and the forward member 118 extending from the base 110 toward the rear member 114 at an angle that is less than 90 degrees. The rear member 114, the center stanchion 116, and the forward member 118 form an a-shaped frame 105. The frame structure 102 also includes the top member 120 and the cross member 119.

Additionally, the frame structure 102 includes a support strut 202 extending at an acute angle from the base 110 at approximately an attachment point of the center stanchion 116 to the lower member supporting structure 132. In a particular illustrative embodiment, the trailer 100 also includes a bracket 204 to secure a brake mechanism (such as the brake 148 in FIG. 1) to the base 110. Additionally, the trailer 100 includes a bracket 206 to secure extendable supports (such as the supports 150 in FIG. 1) to the base 110. The trailer 100 also includes the step 142 and the handle 144 to facilitate access to the upper mounting structures 130. The trailer 100 can also include a storage box 146 to store bolts, tools and other equipment. Additionally, the trailer 100 can include a storage bracket 140 to store a trailer tow rod (such as the tow rod 136 in FIG. 1) when the trailer 100 is not in use.

The upper mounting structure 130 includes an attachment portion 210 that is coupled to the upper member 120, a conical portion 212 adapted to mate with a corresponding mounting structure of an engine (i.e., an aircraft engine), and an opening 208. The conical portion 212 is adapted to guide the mounting structure of the engine into a desired position relative to the upper mounting structure 130. The opening 208 provides access to a nut, such as a barrel nut or other fastener (shown in FIG. 6), that receives and secures a bolt from the corresponding mounting structure of the engine.

The lower mounting structure 134 includes an attachment portion 216 coupled to a cross member (such as the cross member 129 in FIG. 1) and includes a conical portion 214 to guide a corresponding mounting structure of the engine into a desired position relative to the lower mounting structure 134. Additionally, the lower mounting structure 134 includes an opening 218 to allow access for a fastener (such as a bolt shown in FIG. 8) and a tool to tighten the bolt to secure the engine to the lower mounting structure 134.

In a particular illustrative embodiment, mount structures of the engine can be secured to the upper and lower mounting structures 130 and 134 via fasteners. The frame 102 uses the upper and lower mounting structures 130 and 134 to secure the engine in a horizontal position relative to the base 110 such that frame 102 supports the entire weight of the engine.

The frame structure 102 is secured to the base 110 such that the center stanchion 116 is positioned above the rear wheel 220. The rear member 114 is positioned behind the rear wheel 220 and the forward member 118 is secured to the base 110 proximate to a center portion of the base 110. The center of the base 110 is generally indicated by dashed line 222. The frame structure 102 is offset toward the rear portion 104 of the trailer 100. Since the engine housing and propeller of the engine extend over the base 110 toward the front portion 152 of the trailer 100, the frame structure 102 maintains a center of gravity of the engine (when mounted) approximately centered over the base 110. Thus, the weight of the engine is translated to the base 110 via the frame structure 102 in such a way that the trailer 100 is stable during transit and/or storage.

Figure 3:
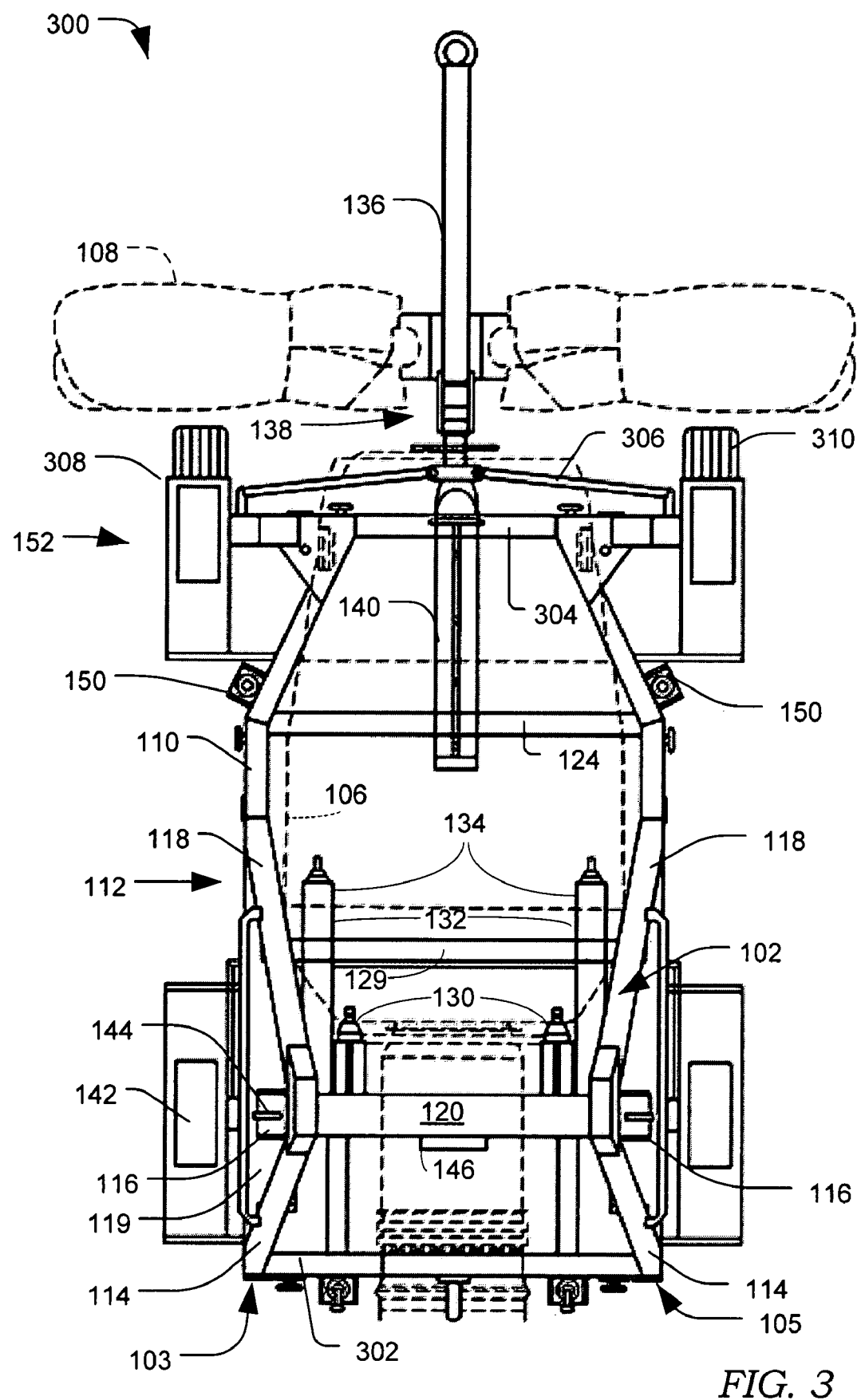
FIG. 3 is top view of the apparatus of FIG. 1.

FIG. 3 is top view of the trailer 100 of FIG. 1. The trailer 100 includes a base 110 and a frame portion 102 that extends from the base 110. The frame portion 102 includes rear members 114, center stanchions 116, and forward members 118, which are connected by a top member 120. The rear members 114, the center stanchions 116, and the forward members 118 form a pair of a-shaped frames 103 and 105 that extend from the base 110 at an angle that is less than 90 degrees toward a longitudinal center of the trailer 100. The frame 102 also includes upper mount structures 130, a cross member 128 (shown in FIG. 1), supporting mounting structures 132, and lower mount structures 134.

The base 110 includes a rear cross member 302, cross member 124, and a front cross member 304. The trailer 100 includes a steering mechanism 306 that is coupled to an axle (not shown) that is associated with the front wheels 308 and 310 to control a direction of motion of the trailer 100. The steering mechanism 306 is coupled to the trailer tow bar 136 via the coupling mechanism 138.

The engine 106 and the propeller 108 are shown in phantom to illustrate a position of the engine 106 relative to the frame structure 102 and the base 110. The engine 106 is mounted to the frame structure 102 via the upper and lower mounting structures 130 and 134. The frame structure 102 via the forward members 118 and the center stanchions 116 translate the weight of the engine 106 and the propeller 108 to the base 110.

The engine 106 can be mounted to the frame structure 102 by the upper and lower mounting structures 130 and 134 to suspend the engine above the base 110. The top member 120 is centered over the rear wheels and the frame structure 102 is positioned over the rear half of the base 110, such that a center of gravity of the engine 106 is located at an approximate center of the base 110 (i.e. in a center portion 112 of the base 110). Depending on the engine to be supported, in a particular illustrative implementation of the trailer 100, the location of the frame structure 102 with respect to the base 110 may be altered such that the center of gravity of the particular engine 106 is centered over the trailer 100.

Figure 4:
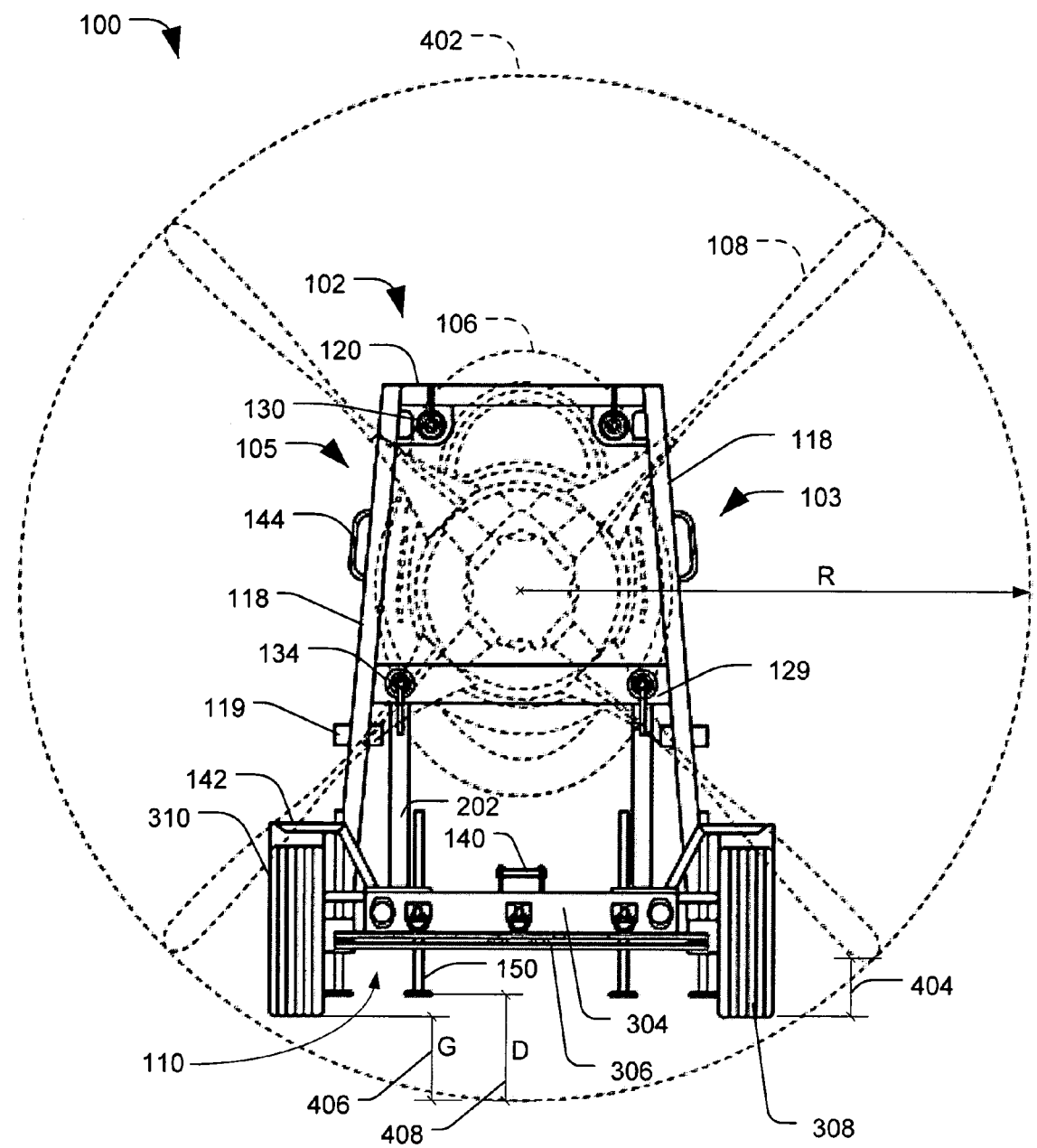
FIG. 4 is a front view of the apparatus of FIG. 1.

FIG. 4 is a front view of the trailer 100 supporting the engine 106 that is illustrated in FIG. 1. The trailer 100 includes a base 110 including a front cross member 304 and a steering mechanism 306. The trailer 100 also includes a frame structure 102 that includes a-shaped frames 103 and 105 coupled by the top member 120 and the cross member 129.

The engine 106 with the propeller 108 is mounted to the upper and lower mounting structures 130 and 134. The blades of the propeller 108 extend out from a center of rotation by a radial distance (R). The radial distance can be represented as a circle, generally indicated by dashed line 402. The circle 402 represents the path traveled by the tips of the blades of the propeller 108 during rotation. As shown, the travel position of the blades of the propeller 108 allow for ground clearance, as indicated at 404. However, the circle 402 extends below the ground surface (G) as indicated at 406. Supports 150 may be extended by a distance (D), as indicated at 408, to raise the front of the trailer 100 to provide clearance for the propeller 108 to be rotated. Thus, the engine 106 can be mounted to the trailer 100 and stored for periods of time and the propeller 108 can be rotated periodically to allow oil to circulate to bearings within the engine 106 without having to remove the engine 106 from the trailer 100. When the propeller 108 is being rotated, the trailer tow bar 136 (shown in FIGS. 1 and 3) may be removed and stored in the bracket 140.

Figure 5:
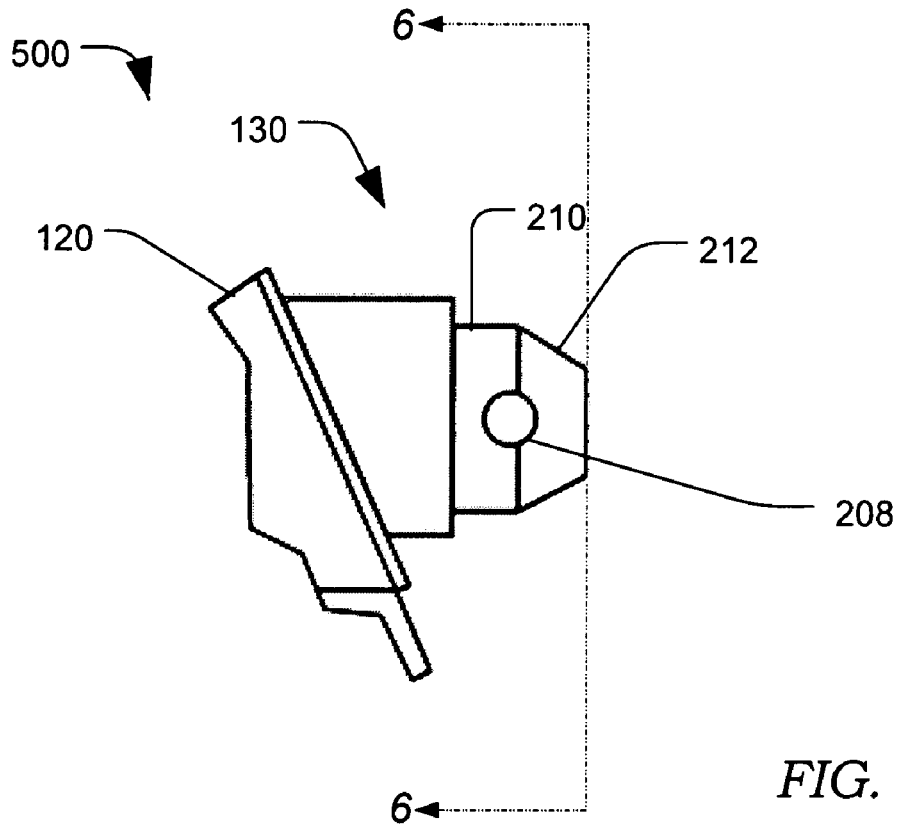
FIG. 5 is a side view of a particular illustrative embodiment of an upper mount support portion of the apparatus of FIG. 1.

FIG. 5 is a side view of a particular illustrative embodiment of a portion 500 of an upper mount support 130 of the trailer 100 of FIG. 1. The portion 500 includes a portion of the top member 120 and the upper mounting support 130. The upper mounting support 130 includes an attachment portion 210, a conical portion 212 and an opening 208 to allow access to a nut or other fastening component for locking a mounting component from the engine to the upper mounting support 130. The attachment portion 210 couples the upper mount support 130 to the top member 120. The conical portion 212 is adapted to mate with a corresponding mount structure of an aircraft engine.

Figure 6:
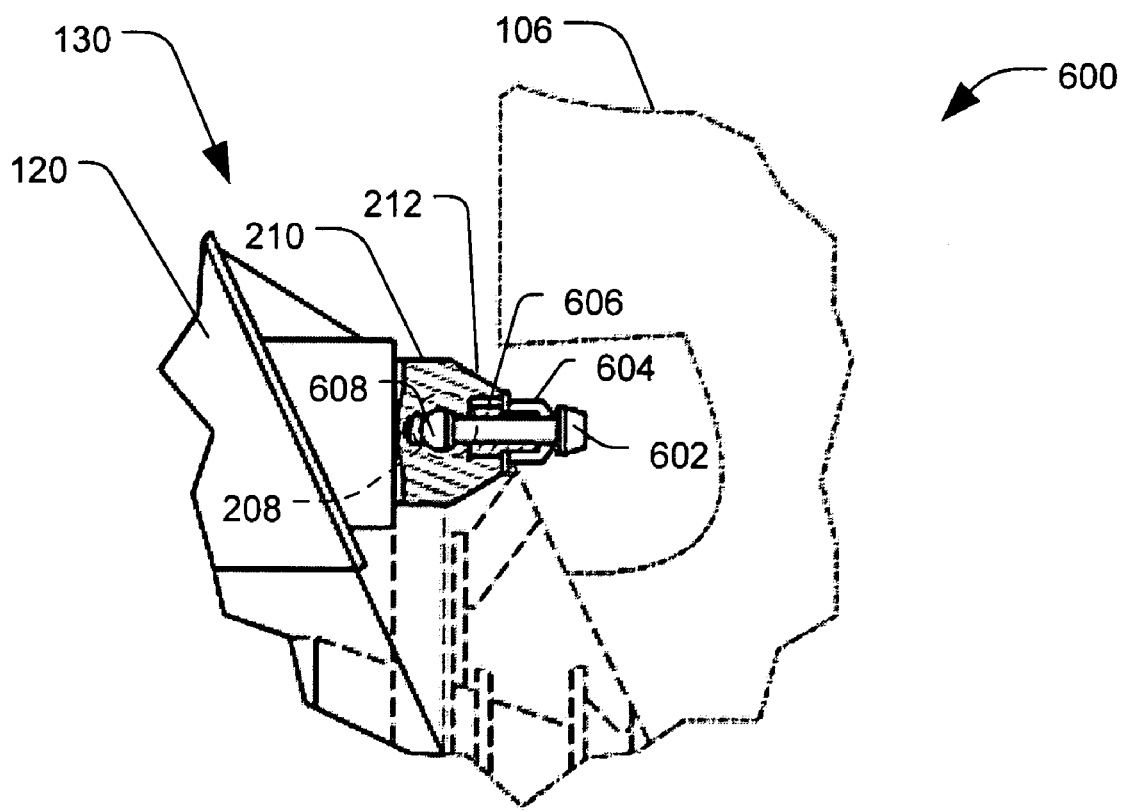
FIG. 6 is a cross-sectional view of the upper mount support portion of FIG. 5, taken along line 6-6.

FIG. 6 is a cross-sectional view of a portion 600 of the upper mount support portion 130 of FIG. 5, taken along line 6-6. A portion of the engine 106 is also shown. A fastener 602 (such as a bolt) extends from a corresponding mount structure (not shown) of the engine 106 into the center of the conical portion 212 and into the attachment portion 210 of the upper mounting structure 130. The fastener 602 extends through a spacer 604 and a bushing 606 and into a barrel nut 608, which may be accessed via the opening 208 (illustrated in phantom) to secure the fastener 602.

Figure 7:
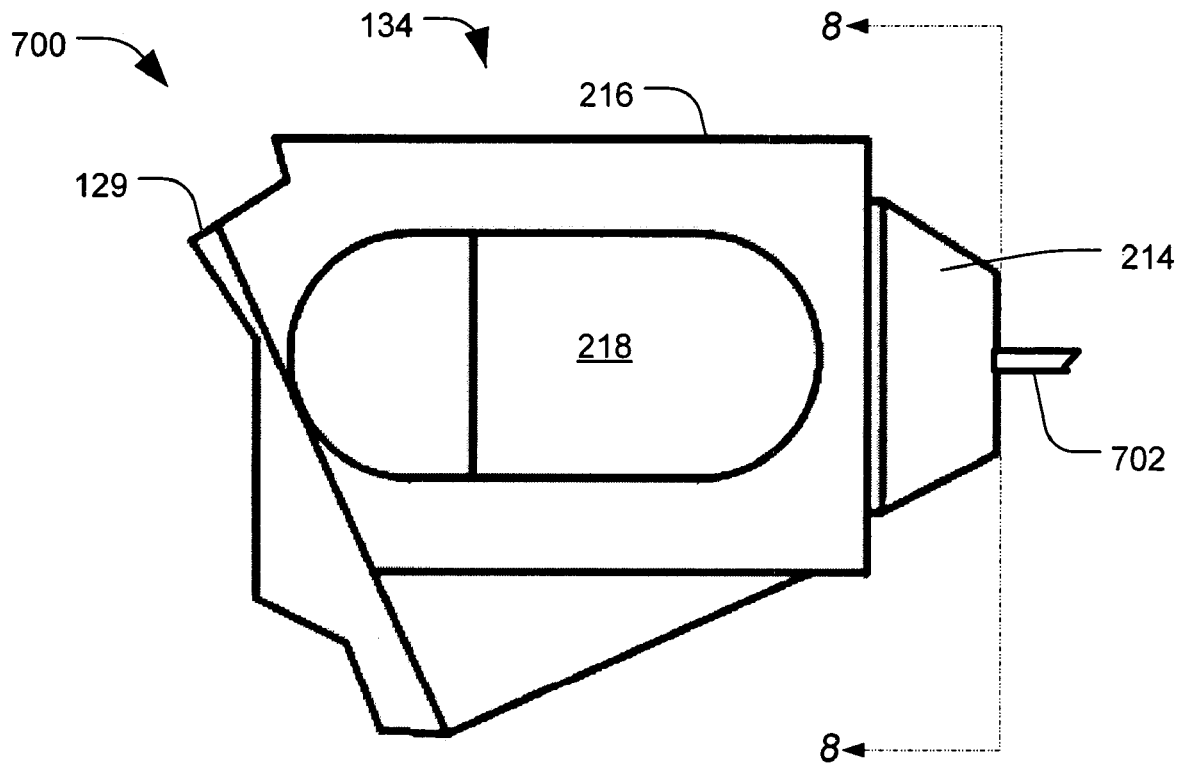
FIG. 7 is a side view of a particular illustrative embodiment of a lower mount support portion of the apparatus of FIG. 1.

FIG. 7 is a side view of a particular illustrative embodiment of a portion 700 of a lower mount support 134 of the trailer 100 of FIG. 1. The portion 700 includes a portion of the cross member 129 and the lower mounting structure 134, which is coupled to the cross member 129. The lower mounting structure 134 includes an attachment portion 216, a conical portion 214 and an opening 218, which allows access to a cavity within the mounting structure 134 that is sized to receive a tool to tighten or loosen the fastener 702. The attachment portion 216 couples the lower mount support 134 to the cross member 129. In a particular illustrative embodiment, the fastener 702 may be inserted into the opening 218 and through a second opening (not shown) in an end of the conical portion 214 to mate with a corresponding recess of a mounting structure (not shown) within the engine 106. In another particular illustrative embodiment, the fastener 702 is secured within the conical portion 214 and can be accessed via the opening 218 to tighten or loosen the fastener 702 with respect to the corresponding mounting structure of the engine 106.

Figure 8:
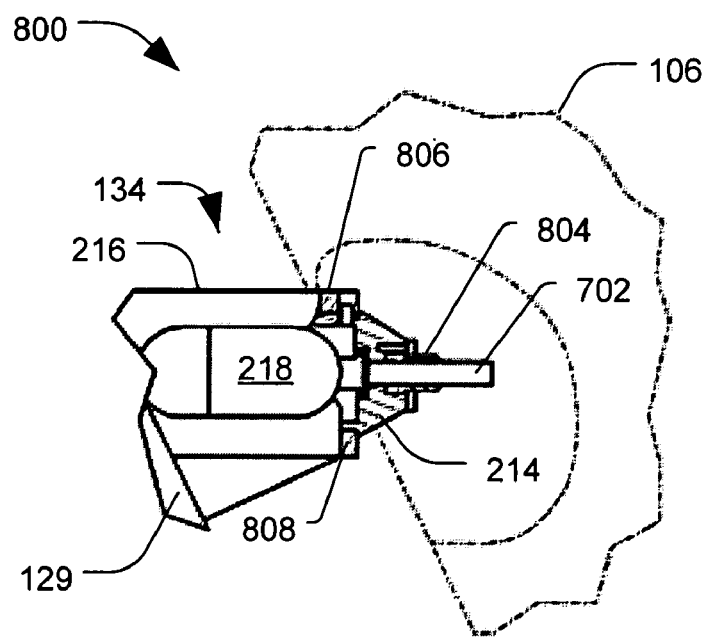
FIG. 8 is a cross-sectional view of the lower mount support portion of FIG. 7, taken along line 8-8.

FIG. 8 is a cross-sectional view of a portion 800 of the lower mount support 134 of FIG. 7, taken along line 8-8. A portion of the engine 106 is shown in phantom. The lower mounting support 134 includes an opening 218 to receive a tool (not shown) for tightening or loosening the fastener 702. The fastener 702 may be secured within the lower mounting structure by a bushing 804 within the lower mounting support 134. Additionally, the fastener 702 may extend through the conical portion 214 and through bushings 804 into the corresponding mounting structure of the engine 106. In a particular illustrative embodiment, the lower mounting structure 134 may include spacers 806 and 808 to provide padding or spacing between the housing of the engine 106 and the lower mounting structure 134.

Figure 9:
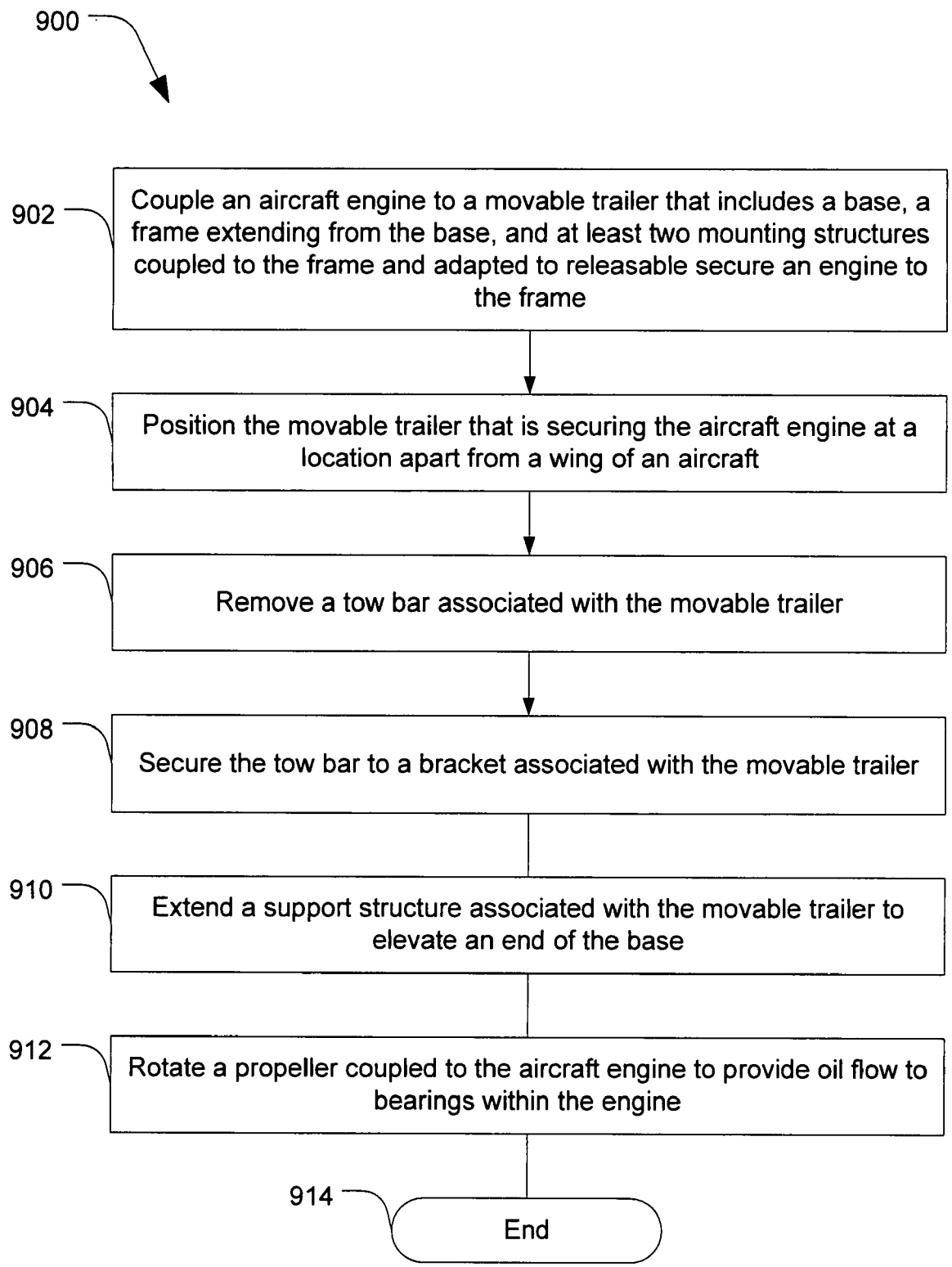
FIG. 9 is flow diagram of a particular illustrative embodiment of a method of transporting an engine.

FIG. 9 is flow diagram 900 of a particular illustrative embodiment of a method of transporting an engine. At 902, the method includes coupling an aircraft engine to a movable trailer comprising a base, a frame extending from the base, and at least two mounting structures coupled to the frame and adapted to releasably secure an engine to the frame such that the engine is secured to the frame and suspended above the base without contacting the base. In a particular illustrative embodiment, a propeller may be attached to the aircraft engine during transit. Advancing to 904, the method includes positioning the movable trailer that is securing the aircraft engine to a location apart from a wing of an aircraft. For example, the aircraft engine may be moved into a service area within a hanger. In a particular illustrative embodiment, a replacement engine may be attached to the wing of the aircraft so that the aircraft can be put back into the service while the other engine is being serviced. Proceeding to 906, the method includes removing a tow bar associated with the movable trailer. Continuing to 908, the tow bar is secured to a bracket associated with the movable trailer. Moving to 910, the method includes extending a support structure associated with the movable trailer to elevate an end of the base. Advancing to 912, the method includes rotating a propeller coupled to the aircraft engine to provide oil flow to bearings within the engine. The method terminates at 914.

At least two mounting structures are adapted to mate with corresponding engine mounting structures of the aircraft engine. In a particular illustrative embodiment, the mounting structures may include structures that include an attachment portion and a conical shaped portion that mate with corresponding mounting structures of the aircraft engine, which may otherwise be used to mount the aircraft engine to a wing of an aircraft. The aircraft engine may then be transported, using the trailer, without removing the propeller.

In conjunction with the configuration of structure described herein, the trailer usable to transport an engine includes a base, a frame extending from the base, and mounting structures coupled to the frame to secure and support an aircraft engine that has been removed from a wing of an aircraft. The mounting structures mate with corresponding mounting structures within the aircraft engine, which are otherwise used to secure the aircraft engine to the wing of the aircraft. The mounting structures support the aircraft engine above the base, such that the frame and the mounting structures bear the weight of the aircraft engine. Additionally, the frame may be positioned along the base such that a center of gravity of the aircraft engine is approximately centered over a center of the base. In a particular illustrative embodiment, the trailer may include extendable supports that can be used to elevate an end of the base to provide clearance for the propeller to be rotated while the aircraft engine remains secured to the frame.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A trailer comprising:
    a base;
    a frame extending from the base; and
    at least two mounting structures coupled to the frame and adapted to releasably secure an engine to the frame such that the engine is secured to the frame and suspended above the base without contacting the base, wherein a first mounting structure of the at least two mounting structures includes a conical portion sized to fit a corresponding mounting structure associated with the engine, the conical portion including an opening sized to receive a fastener associated with the engine, and a side opening adapted to provide access to tighten or loosen a nut to secure the fastener.

2. The trailer of claim 1, wherein the base comprises a movable chassis.

3. The trailer of claim 2, further comprising:
    a towing rod that is releasably coupled to the base; and
    a bracket coupled to the base and sized to secure the towing rod when the towing rod is decoupled from the base.

4. The trailer of claim 1, wherein the base comprises:
    a rear axle coupled to two pneumatic tires; and
    a front axle coupled to two pneumatic tires;
    wherein the frame extends from the base proximate to the rear axle.

5. A trailer comprising:
    a base;
    a frame extending from the base, said frame including a pair of A-shaped frames extending in a direction that is substantially normal to the base, a top member coupled to distal ends of the pair of A-shaped frames, and a cross member coupled between the pair of A-shaped frames; and
    at least two mounting structures coupled to the frame and adapted to releasably secure an engine to the frame such that the engine is secured to the frame and suspended above the base without contacting the base, wherein a distance between the top member and the cross member is at least partially determined by a pre-defined spacing between the at least two mounting structures.

6. The trailer of claim 5, wherein a first mounting structure of the at least two mounting structures is coupled to the top member.

7. The trailer of claim 5, wherein at least one mounting structure of the at least two mounting structures is coupled to the cross member.

8. The trailer of claim 1, wherein a second mounting structure of the at least two mounting structures comprises:
    a conical portion sized to fit a corresponding mounting structure associated with the engine; and
    an attachment portion coupled to the second mounting structure conical portion, the attachment portion including an opening sized to receive a first fastener and a tool to rotate the first fastener to releasably couple the first fastener to the corresponding mounting structure of the engine.

9. The trailer of claim 1, further comprising:
    a step coupled to the frame and adapted to support a worker; and
    a handle coupled to the frame to allow access to the at least two mounting structures.

10. The trailer of claim 1, further comprising:
    a releasable tow rod adapted to be coupled to a vehicle; and
    a bracket adapted to secure the releasable tow rod when not in use.

11. The trailer of claim 1 in which said engine is an aircraft engine, said base includes a front axle having a pair of wheels and a rear axle having a pair of wheels, said frame extends from the base at a location along the base that is proximate to the rear axle, and the aircraft engine is supported by the frame without contacting the base.

12. The trailer of claim 11, wherein a center of gravity of the aircraft engine is approximately centered above a center of the base.

13. The trailer of claim 11, wherein the pair of wheels associated with the front axle and the pair of wheels associated with the rear axle comprise pneumatic tires.

14. The trailer of claim 11, further comprising a storage box coupled to the frame and sized to receive at least one tool.

15. The trailer of claim 11, wherein the mounting structures comprise:
    upper mounting structures coupled to a top cross member of the frame; and
    lower mounting structures coupled to a lower cross member of the frame.

16. The trailer of claim 11, wherein each mounting structure comprises:
    an attachment portion coupled to the frame; and
    a conical portion sized to mate with an engine mounting structure associated with the aircraft engine.

17. The trailer of claim 11, wherein the frame translates and distributes weight from the aircraft engine to the base.

18. A trailer comprising:
    a base;
    a frame extending from the base, wherein the frame comprises:
        a first A-shaped frame extending substantially normal to the base on a first side;
        a second A-shaped frame extending substantially normal to the base on a second side;

a top member coupling the first A-shaped frame to the second A-shaped frame at their respective apexes; and a cross member coupling the first A-shaped frame to the second A-shaped frame at a location along the A-shaped frames that is below the respective apexes; and at least two mounting structures coupled to the frame and adapted to releasably secure an engine to the frame such that the engine is secured to the frame and suspended above the base without contacting the base, in which said engine is an aircraft engine, said base includes a front axle having a pair of wheels and a rear axle having a pair of wheels, said frame extends from the base at a location along the base that is proximate to the rear axle, and the aircraft engine is supported by the frame without contacting the base.

19. The trailer of claim 18, wherein each A-shaped frame of the first and second A-shaped frames comprises:

a rear member having a proximal end and a distal end, the proximal end of the rear member coupled to the base at a rear portion of the base, the rear member extending from the base at an angle toward a front portion of the base;

a center stanchion having a proximal end and a distal end, the center stanchion coupled to the base at the proximal end of the center stanchion and extending from the base at an angle that is approximately normal to the base; and a forward member having a proximal end and a distal end, the proximal end of the forward member coupled to the base at a center portion of the base, the forward member extending from the base at an angle toward the rear portion;

wherein the rear member, the center stanchion and the forward member are coupled at their respective distal ends at their respective apex.

20. A trailer comprising:

a base;

a frame extending from the base; and at least two mounting structures coupled to the frame and adapted to releasably secure an engine to the frame such that the engine is secured to the frame and suspended above the base without contacting the base, in which said at least two mounting structures include a first mounting structure and a second mounting structure, and said engine is an aircraft engine, said first mounting structure being coupled to the frame at a first height and adapted to mate with a first corresponding engine mounting structure of the aircraft engine, the first mounting structure comprising a first opening sized to receive a first fastener associated with the aircraft engine and a second opening to provide access to a nut to secure the first fastener; and said second mounting structure being coupled to the frame at a second height and adapted to mate with a second corresponding engine mounting structure of the aircraft engine, the second mounting structure comprising a third opening sized to hold a second fastener to mate with a corresponding recess of a mount structure associated with the aircraft engine;

wherein the first mounting structure and the second mounting structure cooperate to secure and support the aircraft engine such that the aircraft engine does not contact the base.

21. The trailer of claim 20, wherein the second mounting structure further comprises a fourth opening sized to receive a tool adapted to tighten or loosen the second fastener.

22. The trailer of claim 20, further comprising a support structure adapted to elevate the base to provide clearance for rotating a propeller coupled to the aircraft engine.

23. The trailer of claim 20, wherein the first height is greater than the second height and wherein a difference between the first height and the second height is related to a relative spacing of the corresponding mounting structures of the aircraft engine.

24. A method of transporting an aircraft engine, the method comprising:

coupling an aircraft engine to a trailer, said trailer including a base, a frame extending from the base, and at least two mounting structures coupled to the frame and adapted to releasably secure the aircraft engine to the frame such that the aircraft engine is secured to the frame and suspended above the base without contacting the base;

positioning the trailer that is securing the aircraft engine at a location apart from a wing of an aircraft;

extending a support structure associated with the trailer to elevate an end of the base; and rotating a propeller coupled to the aircraft engine to provide oil flow to bearings within the aircraft engine.

25. The method of claim 24, wherein the propeller is attached to the aircraft engine during transit.

26. The method of claim 24, further comprising:

removing a tow bar associated with the trailer; and securing the tow bar to a bracket associated with the trailer.

27. The method of claim 24, wherein the at least two mounting structures are adapted to mate with corresponding engine mounting structures of the aircraft engine.

* * * * *